(12) United States Patent
Smith

(10) Patent No.: US 12,251,742 B2
(45) Date of Patent: Mar. 18, 2025

(54) COATING APPARATUS COMPRISING A CLEANING ARRANGEMENT

(71) Applicant: GRAINTECH INNOVATION PTY LTD, Wendouree (AU)

(72) Inventor: Nicholas Andrew Smith, Wendouree (AU)

(73) Assignee: GRAINTECH INNOVATION PTY LTD, Wendouree (AU)

( * ) Notice: Subject to any disclaimer, the term of this patent is extended or adjusted under 35 U.S.C. 154(b) by 828 days.

(21) Appl. No.: 17/059,966

(22) PCT Filed: May 31, 2019

(86) PCT No.: PCT/AU2019/050559
§ 371 (c)(1),
(2) Date: Nov. 30, 2020

(87) PCT Pub. No.: WO2019/227171
PCT Pub. Date: Dec. 5, 2019

(65) Prior Publication Data
US 2021/0252564 A1    Aug. 19, 2021

(30) Foreign Application Priority Data
Jun. 1, 2018 (AU) ................................ 2018901980

(51) Int. Cl.
*B05C 3/08*    (2006.01)
*B05B 13/02*    (2006.01)
(Continued)

(52) U.S. Cl.
CPC ........ *B08B 9/0808* (2013.01); *B05B 13/0257* (2013.01); *B05C 3/08* (2013.01); *B08B 1/165* (2024.01); *B08B 1/32* (2024.01)

(58) Field of Classification Search
CPC .............................. B05B 13/0257; B05C 3/08
See application file for complete search history.

(56) References Cited

U.S. PATENT DOCUMENTS 3,241,945 A * 3/1966 Sanders ............... C05B 7/00
71/42
3,316,585 A * 5/1967 Kallberg ............... C22B 1/2406
425/222

(Continued)

FOREIGN PATENT DOCUMENTS

AU    2019277266 B2    12/2019
CA    2115687           9/1994
(Continued)

OTHER PUBLICATIONS

Supplementary Search Report dated Feb. 17, 2022, in connection with European Application No. 19810223.

(Continued)

*Primary Examiner* — Karl Kurple
(74) *Attorney, Agent, or Firm* — Norris McLaughlin, PA

(57) ABSTRACT

A cleaning arrangement (200) for a coating apparatus (100). The coating apparatus has a base (123) for carrying loose material. The base is rotatable to coat the loose material. The cleaning arrangement includes a base-scraping arrangement (127) and further includes a mounting arrangement (131) by which the base-scraping arrangement is mounted to be reversibly lowered, from a coating position, to a scraping position at which the base-scraping arrangement is positioned to scrape buildup from the base.

24 Claims, 8 Drawing Sheets

(51) Int. Cl.
    *B08B 1/16*     (2024.01)
    *B08B 1/32*     (2024.01)
    *B08B 9/08*     (2006.01)

(56) References Cited

U.S. PATENT DOCUMENTS

| | | | | |
|---|---|---|---|---|
| 3,752,057 | A * | 8/1973 | Groen, Jr. | B01F 27/82 |
| | | | | 99/348 |
| 3,863,904 | A | 2/1975 | Milik | |
| 4,082,057 | A * | 4/1978 | Hayes | B08B 9/0936 |
| | | | | 118/712 |
| 4,212,615 | A * | 7/1980 | Bennethum | C10L 5/06 |
| | | | | 425/332 |
| 4,214,863 | A * | 7/1980 | Nixon | B01J 2/14 |
| | | | | 425/222 |
| 4,413,970 | A | 11/1983 | Seng | |
| 5,106,428 | A * | 4/1992 | Goerss | B08B 3/02 |
| | | | | 134/102.1 |
| 5,820,893 | A * | 10/1998 | Robertson, IV | C09C 1/58 |
| | | | | 425/363 |
| 5,904,951 | A | 5/1999 | Yamanaka et al. | |
| 6,354,728 | B1 | 3/2002 | Bretschmeider et al. | |
| 2002/0014200 | A1 | 2/2002 | Stemler | |
| 2010/0206223 | A1 * | 8/2010 | Pilipauskas | B01J 2/006 |
| | | | | 118/319 |
| 2011/0203520 | A1 * | 8/2011 | Fusejima | B01J 2/14 |
| | | | | 118/500 |
| 2014/0326327 | A1 * | 11/2014 | Owen | B01F 27/091 |
| | | | | 137/15.07 |
| 2017/0036254 | A1 * | 2/2017 | Caferro | B08B 9/0808 |
| 2017/0209887 | A1 * | 7/2017 | Ikeda | B05B 13/0257 |

FOREIGN PATENT DOCUMENTS

| | | |
|---|---|---|
| CN | 107349855 A | 11/2017 |
| DE | 8705281 U1 | 8/1987 |
| DE | 4411058 A1 | 10/1995 |
| DE | 10124477 C1 | 8/2002 |
| EP | 0761296 A1 | 3/1997 |
| EP | 2992766 B1 | 3/2016 |
| GB | 2070450 A | 9/1981 |

OTHER PUBLICATIONS

Search Report dated Aug. 13, 2021, in connection with European Application No. 19810223.
International Search Report for corresponding application PCT/AU2019/050559 dated Aug. 30, 2019.
International Preliminary Report on Patentability for corresponding application PCT/AU2019/050559 dated Sep. 1, 2020.
Notice of Acceptance for corresponding application AU 201927266 dated Jun. 20, 2022.

* cited by examiner

COATING APPARATUS COMPRISING A CLEANING ARRANGEMENT

This is an application filed under 35 USC 371 of PCT/AU2019/050559, filed 31 May 2019, which claims priority to AU 2018901980, filed 1 Jun. 2018. The present application claims all priority benefits of the foregoing identified applications, as well as incorporating the entirety of their disclosures herein by reference thereto.

FIELD

The present invention relates to a cleaning coating apparatus.

BACKGROUND

Coating apparatus, such as rotary batch coaters, are used to coat loose materials such as seeds and clay granules. By way of example, seeds are routinely coated with one or more substances (such as pesticides, insecticides, coloring and finishing powders) to improve their performance (e.g. to improve germination rates, growth rates and/or resistance to pests). Typically the coating material includes one or more glues and one or more active ingredients. Coating is sometimes referred to as 'pelleting' or 'encrusting'.

In operation the coating material adheres to (and thus forms build-up on) the portions of the coating apparatus that come into contact with the loose material.

An existing approach to batch coating entails periodically using chisels and/or similar hand tools to remove the build-up. Sometimes thinner is required to loosen the build-up. The present inventors have recognised that this is slow (and thus expensive), cumbersome and dangerous.

Embodiments of the present invention seek to provide improvements in and for coating, or at least to provide useful alternatives for those concerned with coating.

SUMMARY

One aspect of the invention provides a cleaning arrangement for a coating apparatus;
the coating apparatus having a base for carrying loose material;
the base being rotatable to coat the loose material;
the cleaning arrangement including
a base-scraping arrangement; and
a mounting arrangement by which the base-scraping arrangement is mounted to be reversibly lowered, from a coating position, to a scraping position at which the base-scraping arrangement is positioned to scrape build-up from the base.

The mounting arrangement may include an actuator to move, e.g. downwardly drive, the base-scraping arrangement.

The base-scraping arrangement is preferably shaped for build-up scraped from the base to be driven, by rotation of the base, outwardly along the base-scraping arrangement to clear the base of the build-up scraped from the base. The base may include a conical outer wall for surrounding the loose material. The base-scraping arrangement may include a portion for scraping the conical outer wall and inclined rearwardly relative to the rotation of the base.

Preferably the base-scraping arrangement includes one or more portions for contacting the build-up and mounted adjustably to enable a clearance to the base to be adjusted.

Optionally the base includes a central raised portion and the base-scraping arrangement is shaped to scrape the central raised portion.

The coating apparatus may include a wall arrangement surrounding, and together with the base defining, a space for holding the loose material. The cleaning apparatus may include a wall-scraping arrangement configured to rotate within the space to scrape build-up from the wall arrangement.

Preferably the cleaning arrangement includes a control arrangement configured to coordinate the base-scraping arrangement and the wall-scraping arrangement.

The wall-scraping arrangement may include one or more portions for contacting the build-up and mounted adjustably to the enable a clearance to the wall arrangement to be adjusted.

Another aspect of the invention provides a coating apparatus including the cleaning arrangement and the base.

The wall arrangement may include an outlet openable to enable build-up to escape the space and closeable to retain the loose material.

Preferably the outlet is aligned with the base-scraping arrangement to receive build-up therefrom.

Another aspect of the invention provides a coating apparatus for coating loose material and including a cleaning arrangement reconfigurable to remove build-up. The coating apparatus may include a control arrangement configured to coordinate the outlet and the cleaning apparatus. The coating apparatus may include a diverter downstream of the outlet reconfigurable to divert material from the outlet to a selected one of at least two destinations. A or the control arrangement may be configured to coordinate the diverter and the cleaning apparatus.

Another aspect of the invention provides a cleaning arrangement for a coating apparatus;
the coating apparatus including a wall arrangement surrounding, and together with the base defining, a space for holding the loose material;
the cleaning apparatus including a wall-scraping arrangement configured to rotate within the space to scrape build-up from the wall arrangement.

Another aspect of the invention provides a coating apparatus including the cleaning arrangement and the wall arrangement.

Another aspect of the invention provides a method of coating loose material including
supplying the loose material and coating material to a space defined by a wall arrangement;
operating a wall-scraping arrangement to scrape build-up from the wall arrangement whilst the loose material and the coating material are agitated to form coated loose material; and then
opening an outlet to enable the coated loose material to leave the space.

The method may include rotating a base to agitate the loose material and the coating material. Preferably the operating the wall-scraping arrangement is counter-rotating the wall-scraping arrangement relative the base.

Another aspect of the invention provides a coating apparatus, for coating loose material, including
a base rotatable about an axis and defining an area for carrying the loose material; and
a wall arrangement surrounding the base;
at least one of the base and the wall arrangement including a replaceable wear arrangement arranged to encircle the area and wear against the other of the base and the wall arrangement.

The replaceable wear arrangement may be a unit, or more preferably an integrally formed member.

The at least one of the base and the wall arrangement may include supporting structure. The replaceable wear arrangement may have an operative portion and be flexible relative to the supporting structure. The supporting structure may support the replaceable wear element to keep the operative portion concentric to the axis.

Optionally the replaceable wear arrangement includes radial bores, e.g. threaded bores, by which the replaceable wear arrangement is attached to the supporting structure.

The replaceable wear arrangement may be a ring, e.g. a ring with a substantially rectangular profile.

Preferably an or the operative portion of replaceable wear arrangement is softer than a portion of the other of the base and the wall arrangement against which the operative portion wears.

Most preferably the wall arrangement includes the replaceable wear arrangement.

BRIEF DESCRIPTION OF DRAWINGS

FIG. 113 is a side view of the coating apparatus;

DESCRIPTION OF EMBODIMENTS

Figure 1:
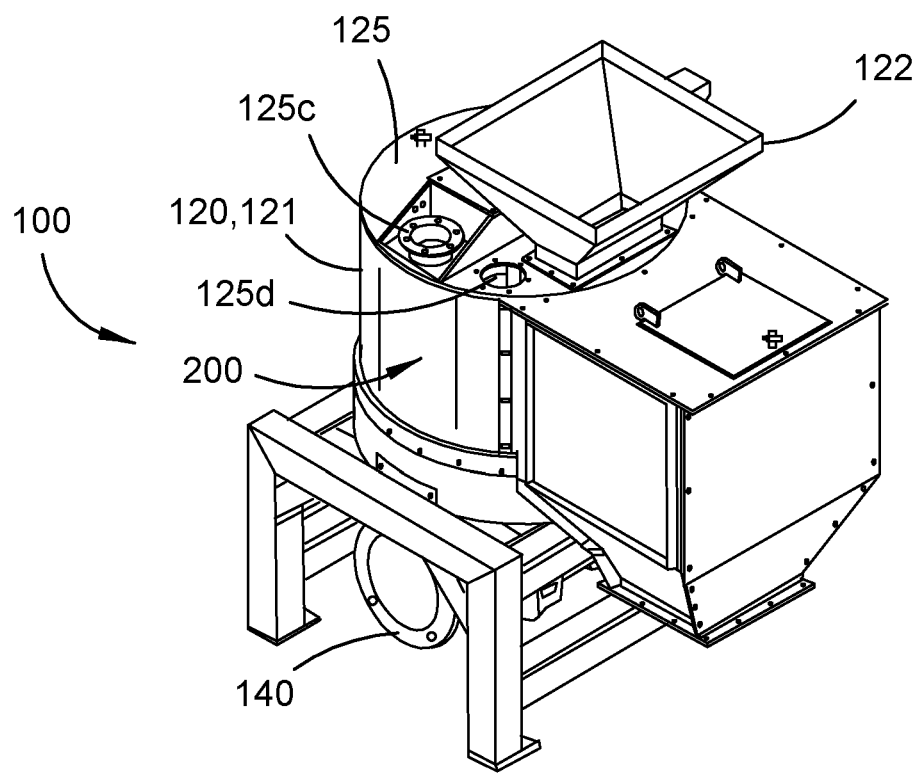
FIG. 1A is a perspective view of components of a coating apparatus.

The coating apparatus 100 is a rotary batch coater for coating seed. The apparatus includes a coating chamber 120 including a wall arrangement 121, a base 123 and a lid 125. The wall arrangement 121 surrounds a space, atop the base 123, for coating the seed. The space is closed by the lid 125. The lid 125 is equipped with a funnel 122 for receiving seed into the seed coating chamber. Other forms of inlet are possible.

Figure 3A:
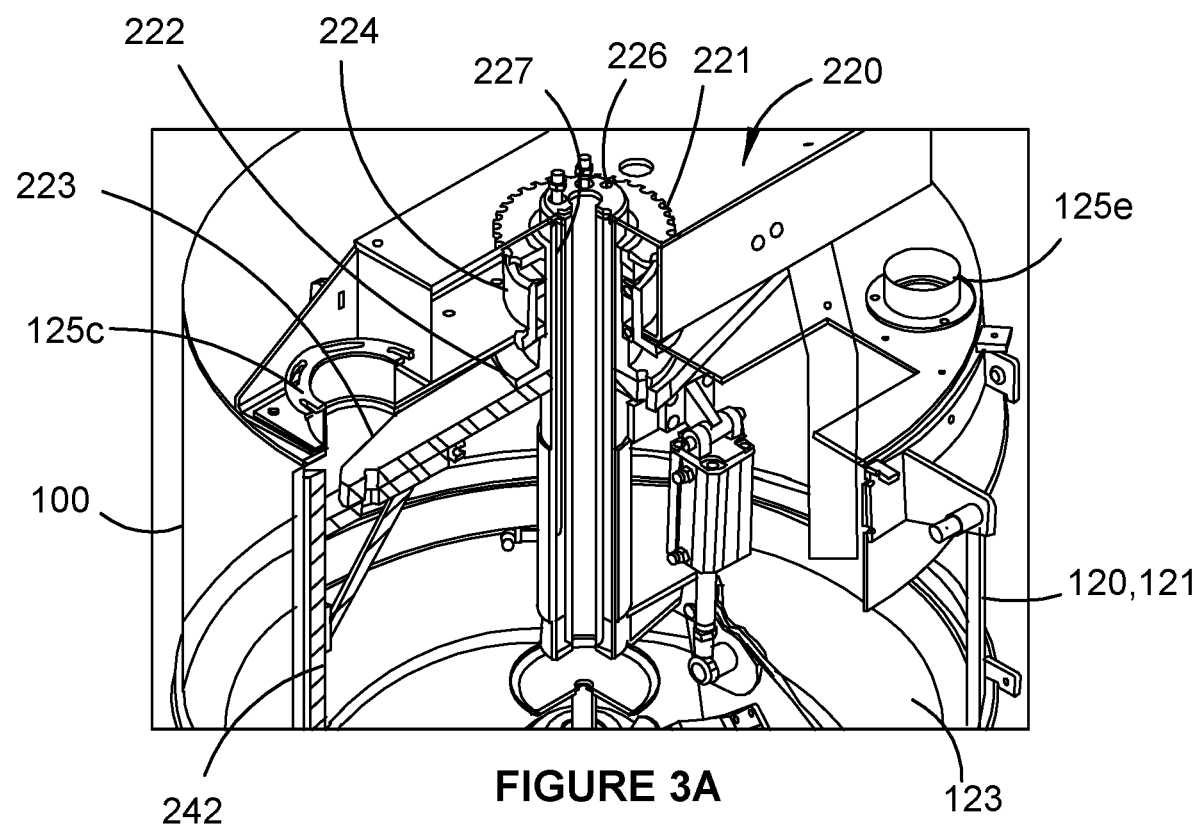
FIG. 3A is a perspective cut away view of the coating apparatus.

The lid 125 further includes a coating material inlet arrangement 125c, 125d and a dust extraction port 125e (FIG. 3A). The coating material inlet arrangement 125c, 125d includes a port 125c, surrounded by a bolting flange, and a simple hole 125d surrounded by bolt holes. When the apparatus 100 is installed as part of a coating installation, the inlets 125c, 125d will typically be plumbed to suitable powder conveying conduits associated with powder dispensing apparatus, e.g. with dispensers incorporating augers responsive to load cells to deliver a defined amount of powder. Typically the port 122 would be connected to a suitable duct via which dust is extracted. Typically the dust-carrying air extracted from the chamber 120 is routed through a suitable filtering arrangement.

An interior of the wall arrangement 121 is substantially cylindrical. Other revolved shapes, such as substantially conical or substantially toroidal, would also be convenient. The base 121 is mounted to rotate about an upright rotation axis RA. Preferably an interior of the wall arrangement 121 is substantially concentric to the axis RA.

In operation seed and coating material are supplied to the chamber 120 and the base is rotated by an underlying motor 140 while the wall arrangement is stationary. The movement and relative movement stirs and agitates the materials to coat the seed in the coating material. The motor 140 may be configured to rotate the rotating base at about 230 RPM. Preferably the speed of the rotating base is adjustable, e.g. the motor 140 might be driven by a variable speed drive.

The apparatus 100 includes a cleaning assembly 200 for cleaning the seed coating chamber. The cleaning assembly 200 includes a hub 220 by which the assembly 200 is suspended from the lid 125. The assembly 200 may be otherwise 20 mounted.

Figure 3B:
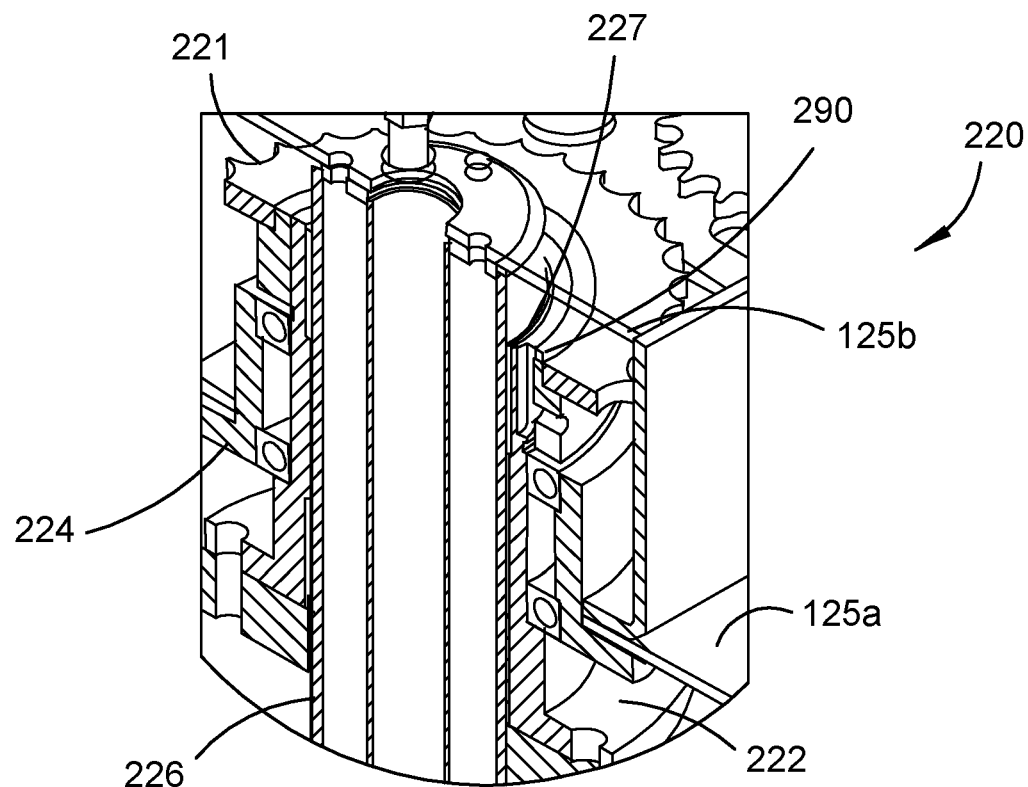
FIG. 3B is a perspective cut away view of a hub of the cleaning arrangement.

As best shown in FIG. 3B, the lid 125 defines a lower portion 125a and an upper portion 125b each of which, in this example, takes the form of a horizontal portion of sheet material.

The cleaning assembly 200 includes a rotatable set of parts 231 and a non-rotating set of parts 233. The rotating set of parts 231 includes sprocket 221 and drive hub 222 of the hub 220. The drive hub 222 is upright and tubular, and includes an outwardly projecting radial flange about its lower end. The sprocket is connected to a top of the drive hub 222 via a connecting ring 290 and arrangements of keys and keyways between the components. The sprocket forms part of a chain-drive transmission by which the rotating set 231 is driven by a motor (not shown).

The drive hub 222 is mounted to rotate with a body mount hub 224 of the hub 220. The hub 224 is upright and tubular, and includes an outwardly projecting radial flange about its lower end. The flange of the hub 224 is a bolting flange by which the hub 224 is fixed to the lower portion 125a.

The non-rotating set 233 is suspended from the upper portion 125b. A suspending member 226 is fastened to the upper portion 125b and extends downwardly through the hub 222. Glacial bearings 227 are fitted between the hub 222 and the member 226 whereby the hub 222 laterally supports the member 226.

This example of the member 226 is a two-part member including an inner cylindrical tube fitted with a sleeve. The portion 125a has an opening via which an interior of the tube is accessible whereby the member 226 constitutes a dosing tube for supplying substances to the chamber 120.

Figure 8:
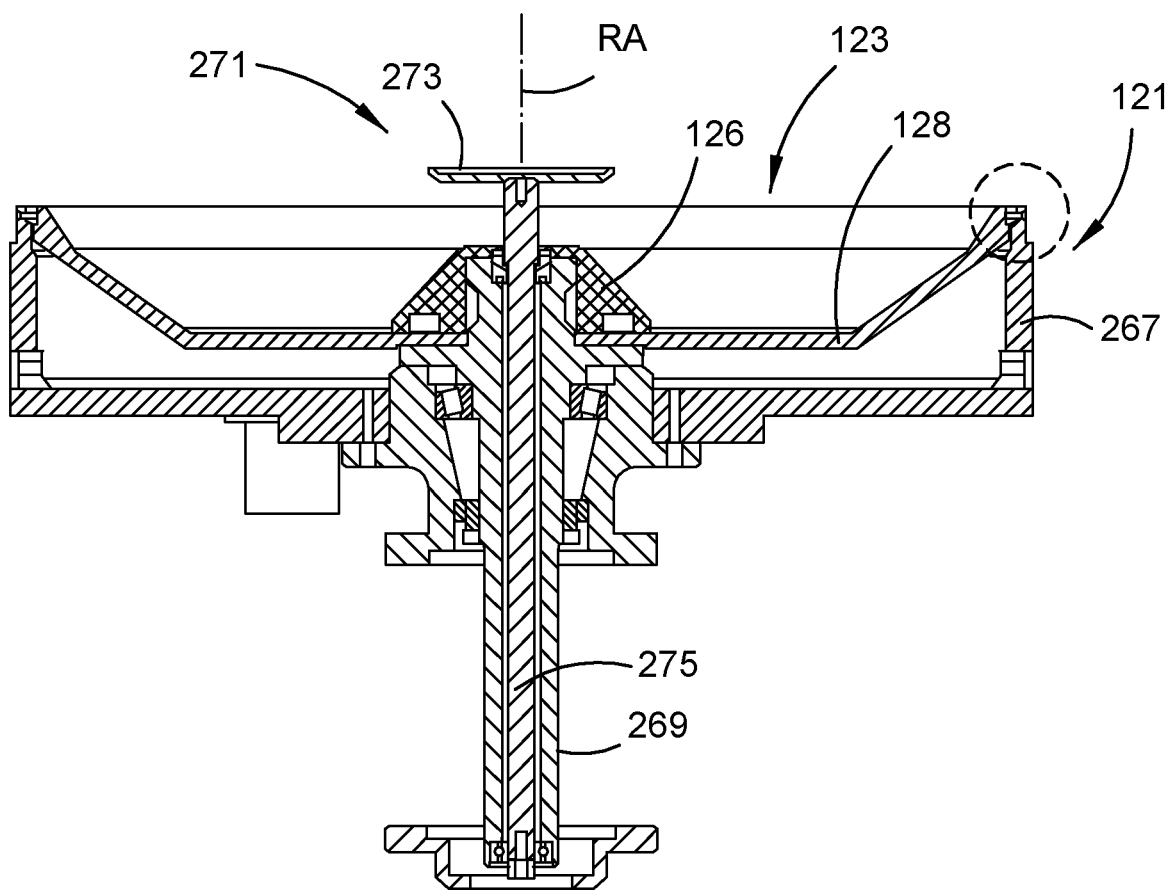
FIG. 8 is a vertical cross section view of components of the coating apparatus.

As best shown in FIG. 8, the base 125 includes a drive hub 126 and an outer body 128 carried by the drive hub 126. The drive hub 126 upwardly presents a downwardly-divergent conical exterior. The outer body defines a horizontal floor 128a and an upwardly divergent conical exterior 128b.

The base 123 is carried by a tubular drive shaft 269 and an arrangement of thrust bearings. An atomising arrangement 271 is arranged to atomise fluid received via the member 226 and includes a rotor 273 at the top of a drive shaft 275 carried concentrically within the drive shaft 269 by bearings. In this example, the rotor 273 takes the form of a saucer-like disc and is positioned to sit above the loose material and rotate at speed, e.g. at 1,400 RPM, to atomise, and disperse over the loose material, the incoming liquid. The member 226 may internally carry several flexible liquid-introducing lines for supplying separate liquids.

Figure 4A:
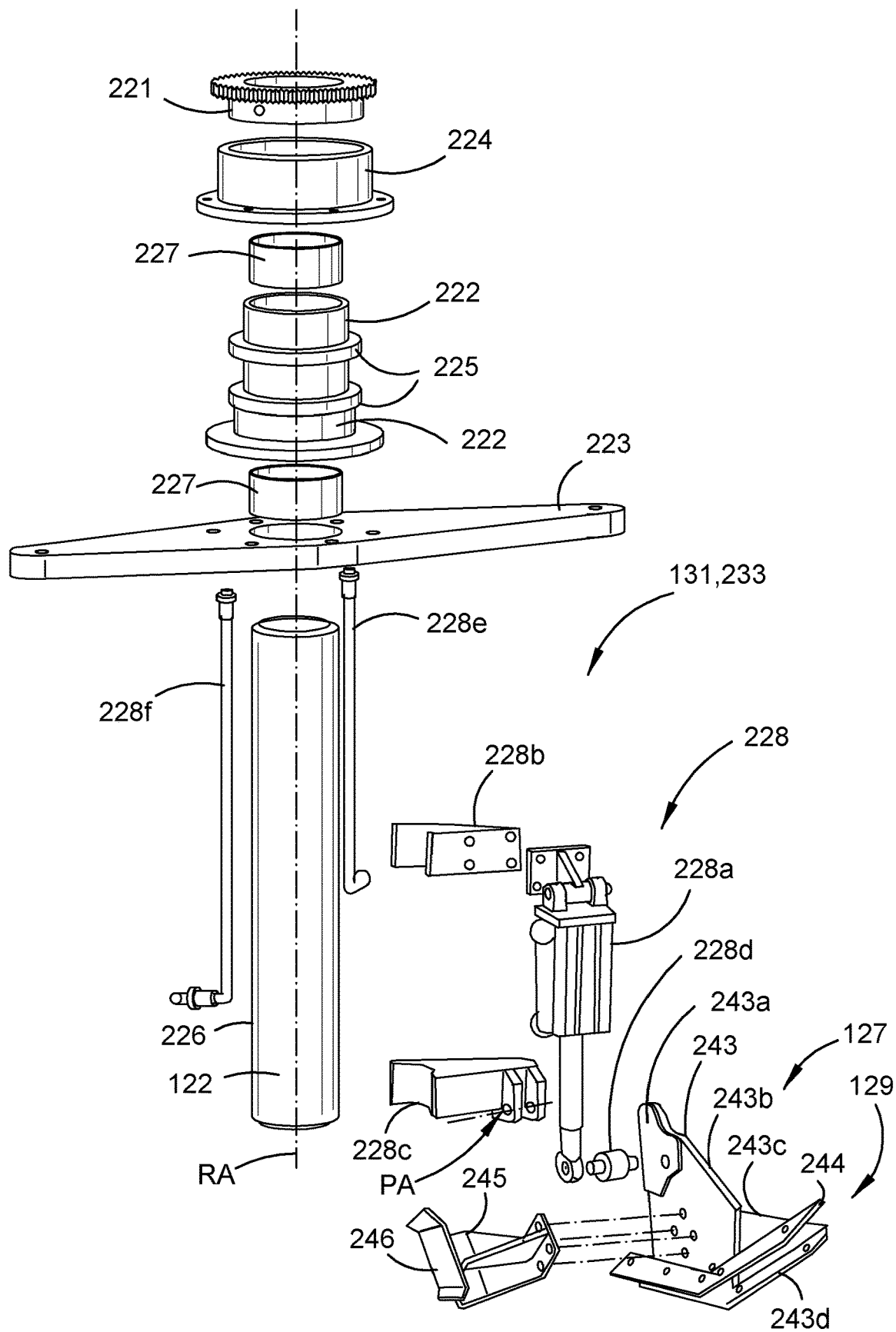
FIG. 4A is an exploded view of the components of FIG. 2.
Figure 4B:
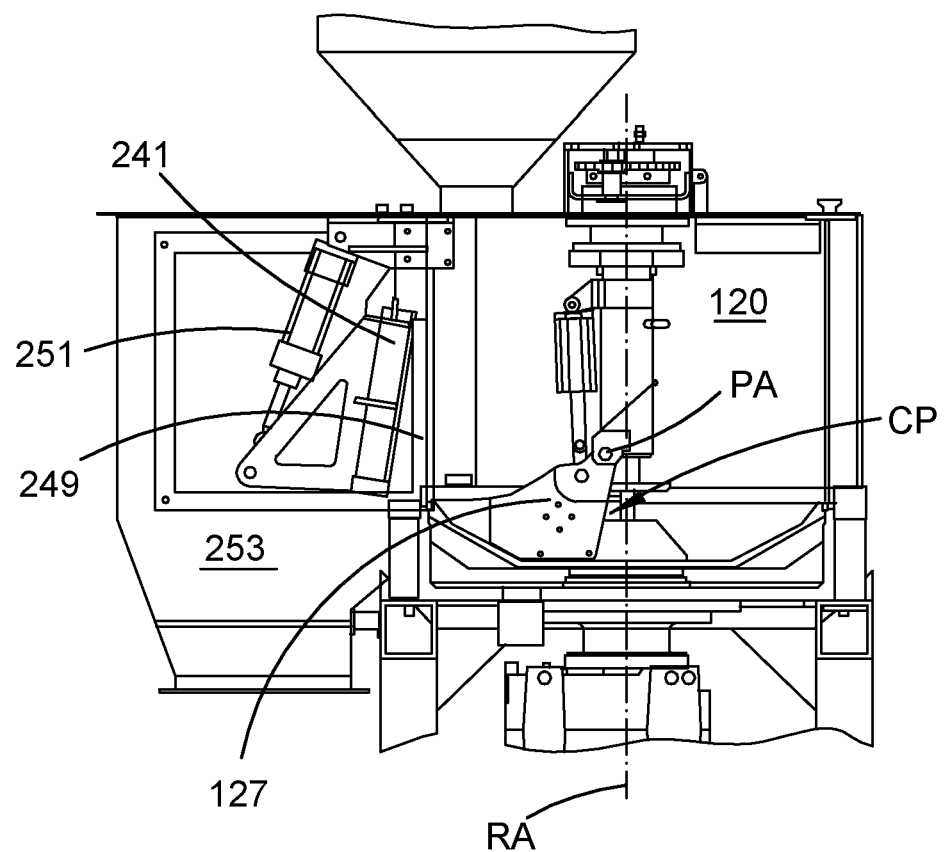
FIG. 4B is a vertical cross-section view of the coating apparatus.

The non-rotating portion 233 includes a base-scraping arrangement 127 (FIG. 4B). The arrangement 127 includes a base-scraping member 129 and a mounting arrangement 131. The mounting arrangement 131 includes the suspending member 226 and an actuated pivotal connection 228 by which the base-scraping member is mounted to be pivotally lowered from coating position to a base-scraping position.

The actuated pivotal connection includes an actuator 228a, upper bracket 228b, lower bracket 228c, spacer 228d and fluid lines 228e, 228f. In this example the actuator is a double acting pneumatic ram and the lines 228e, 228f are pneumatic lines via which the ram is actuated. Preferably the ram is configured to produce 165 kgf at 120 PSI.

The inner tube of the member 226 has a wall thickness within which conduits for carrying the lines 228e, 228f are formed. The lower ends of the lines 228e, 228f emerge laterally from the member 226 and are connected to the actuator 228a via flexible lines (not shown). The tops of the lines 228e, 228f project upwardly beyond the upper portion 125b for connection to a pressure source.

The brackets 228b, 228c are vertically spaced from each other along the member 226. The lower bracket defines a yoke for receiving a vertical planar web 243b of the base-scraping member 129 and via which the member 129 is pivotally mounted. In this case the member 129 is mounted to pivot about a horizontal pivot axis PA. A body of the actuator 228a is pivotally connected to the upper bracket 228b. A rod end of the actuator 228a is pivotally connected to the base-scraping member 129 via the spacer 228d.

The base-scraping member 129 is a five part construction including:
 main body 243 having holes by which the base-scraping member 129 is pivotally mounted and connected to the actuator;
 reinforcement 243a about the holes;
 blade 244 carried by the body 243 to scrape build-up from the body 128 of the base;
 bracket 245; and
 blade 246 carried by the bracket 245.

The main body 243 includes the vertical planar web 243b (perpendicular to the pivot axis PA), a vertical planar web 243c and a planar blade mounting portion 243d. The vertical web 243b is offset from the rotation axis RA by the bracket 228c. The mounting arrangement 228, and more specifically in this case the bracket 228c are configured to position the pivot axis PA in proximity to the rotation axis RA to enable the blade 246 to clean close to the centre of the hub 226 and then pivot upwardly away (as opposed to downwardly into) the base 125 for the coating operation. In this example, the pivot axis PA overlies the build-up-contacting portion CP closest the rotation axis RA. In other variants of the technology the pivot axis PA may be horizontally set back further from the build-up-contacting portions of the base-scraping arrangement 127.

Whilst the bracket 228c offsets the main body 243 from the axis RA, the bracket 245 offsets the blade 246 from the main body 243 to position the blade 246 in proximity to the rotational axis RA to clean the drive hub 126.

Figure 6:
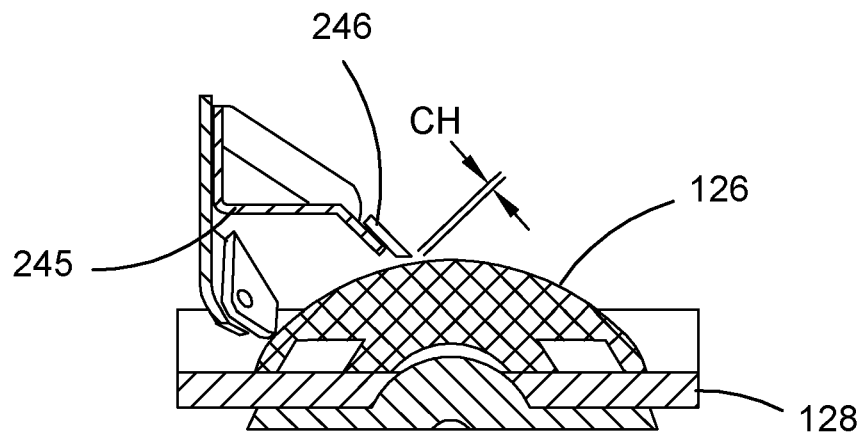
FIG. 6 is a transverse cross section view of a cone-scraping portion of a base-scraping arrangement.

The bracket 245 has a planar flange including a pair of threaded bores. The blade 246 is a planar piece having bolt holes via which bolts engage the threaded bores of the bracket 245 to mount the blade. The bolt holes of the blade 246 are slotted whereby the clearance CH (FIG. 6) to the hub 126 can be adjusted. A nominal clearance within the range of 1 mm to 3.5 mm inclusive is preferred.

The web 243c is inclined relative to the web 243b and meets that web at a vertical corner overlying the junction between the floor 128a and the conical outer base portion 128b. The portion 243c is inclined rearwardly relative to the rotation of the base: when viewed in plan, the portion 243c is also inclined relative to lines tangent to the underlying portions of the base 125 such that loose material carried by these underlying portions of the base ride outwardly along the portion 243c. The base-scraping arrangement 127 is thereby shaped for build-up scraped from the base to be driven, by rotation of the base, outwardly along the base-scraping arrangement.

Figure 7:
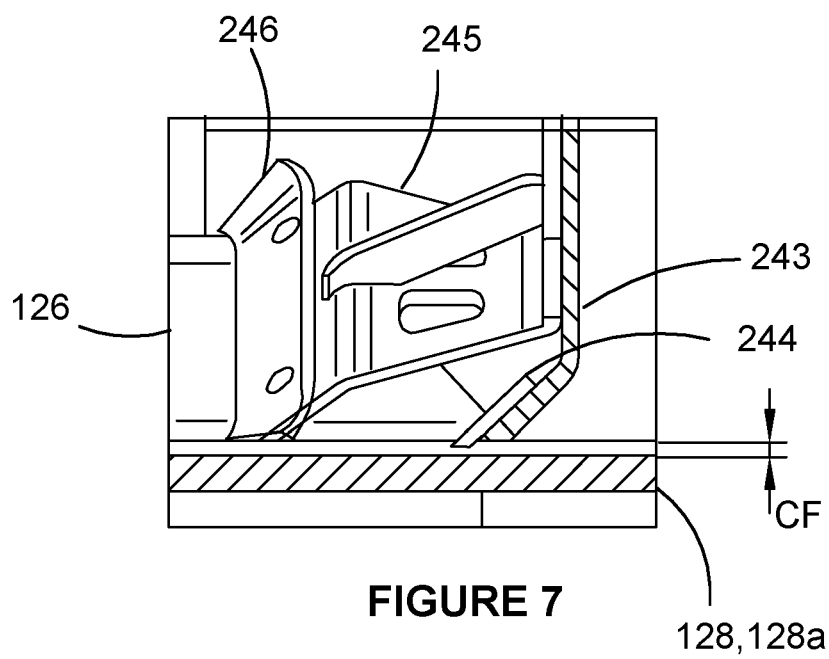
FIG. 7 is a transverse cross section view of a floor-scraping portion of the base-scraping arrangement.

The blade-carrying piece 243d is a planar portion shaped to curve about the lower edges of the portions 243b, 243c. The blade 244 is another planar piece and has a shape complementary to portion 243d. The blade 244 is mounted to the portion 243d in a manner akin to the mounting between components 245, 246 whereby a clearance CF (FIG. 7) to the floor can be adjusted.

The actuator 228 is also adjustable. In this example, the rod of the ram 228 terminates in a rose joint co-operable with the spacer 228d and includes a threaded adjustment by which the effective length of the rod is adjustable.

Figure 2:
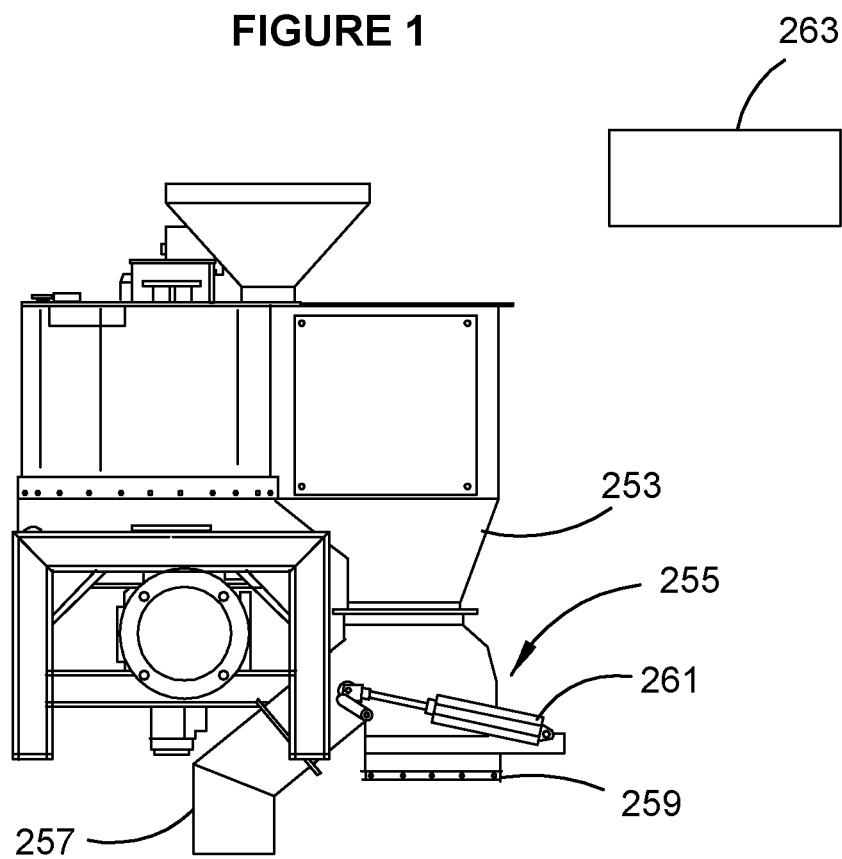
FIG. 2A is a perspective view of components of a cleaning arrangement of the coating apparatus in a coating configuration.
FIG. 2B is a perspective view of components of the coating apparatus in a scraping configuration.
Figure 2A:
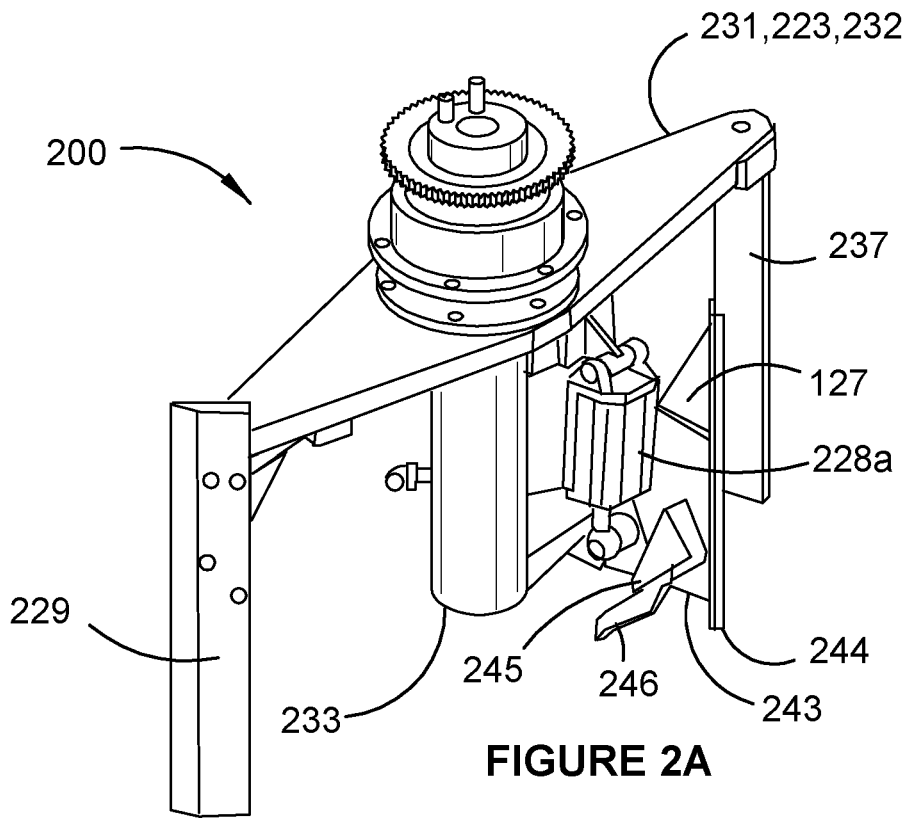
Figure 2B:
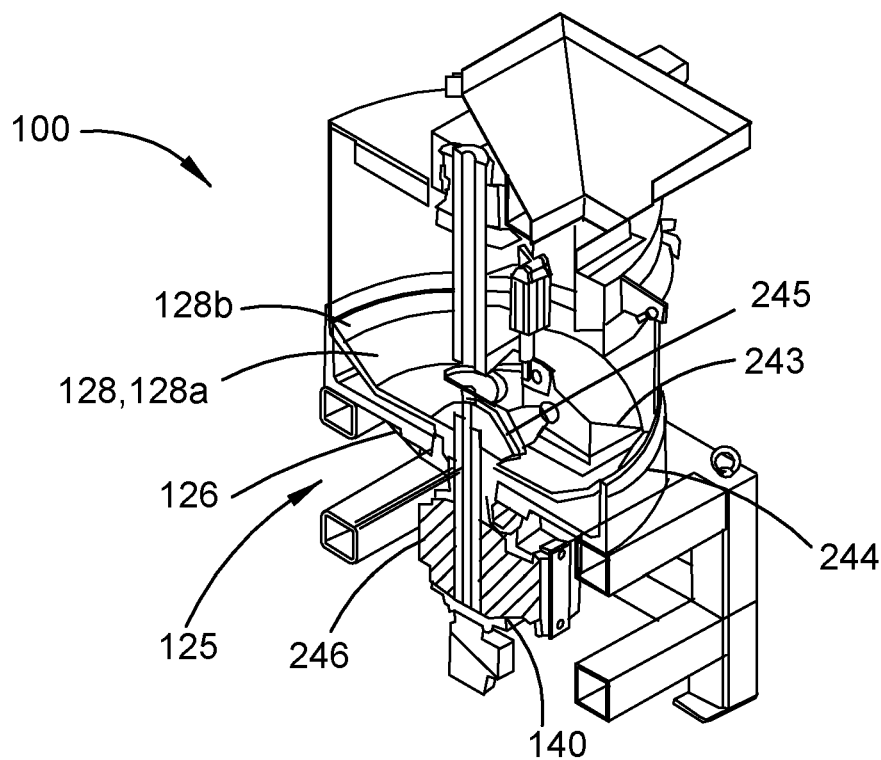

When the base-scraping arrangement 127 is lowered into its operative position the ram 228a is fully extended. Through the aforedescribed adjustments, the clearances to the base 125 can be adjusted. When the ram 228a is retracted to lift the scraping arrangement 127 to its coating position (as in FIG. 2a) scraping arrangement 127 is held clear of the loose material. This reduces the build-up on the base-scraping arrangement itself. It also avoids stressing the loose material. Whilst the loose material is agitated to ensure that it is coated, excessive stress (such as that that might be caused by a lowered base-scraping arrangement) can damage certain loose materials such as seeds.

Figure 5A:
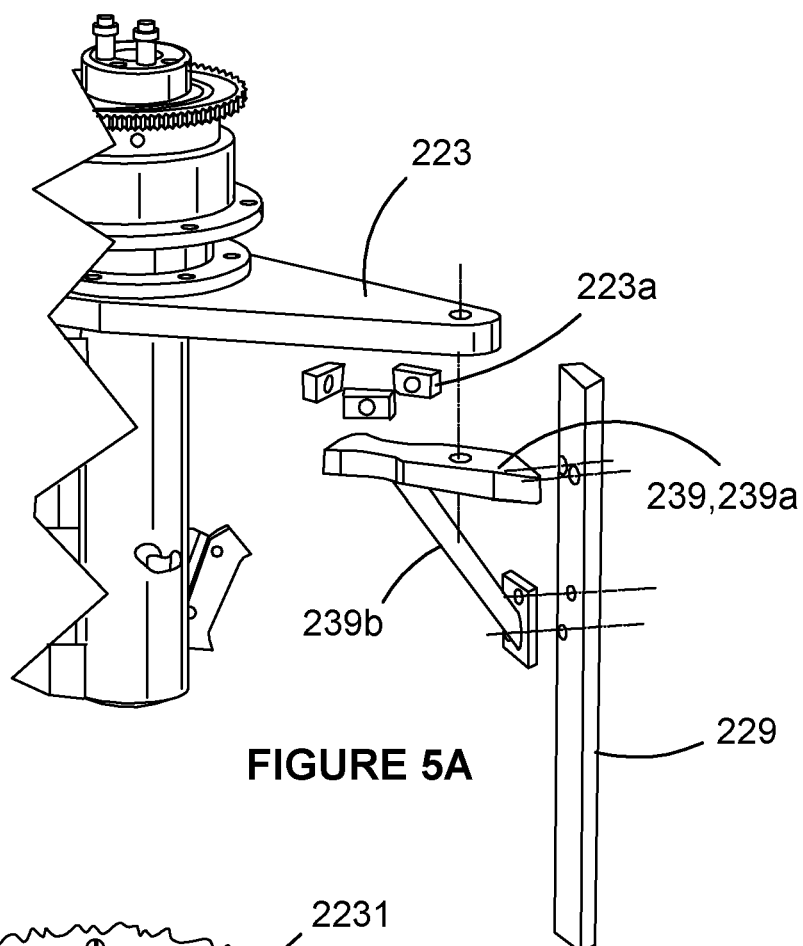
FIG. 5A is an exploded view of a wall-scraping arrangement of the cleaning arrangement.
Figure 5B:
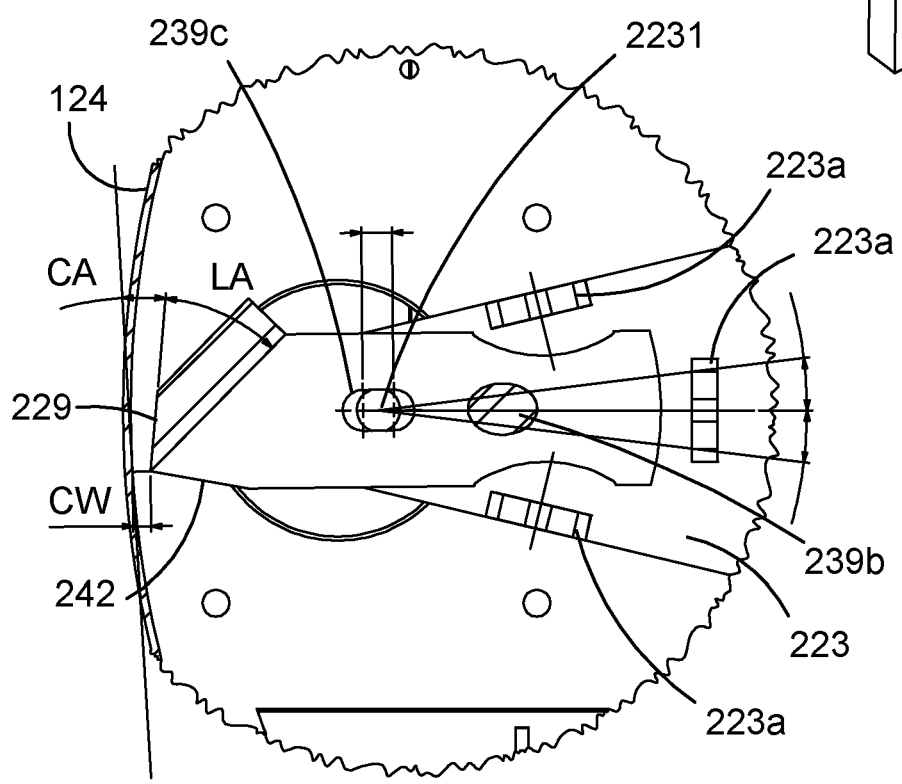
FIG. 5B is a horizontal cross section view of the wall-scraping arrangement from below.

The rotating parts 231 form part of a wall-scraping arrangement 232 and includes an elongate drive arm 223. A mid portion of the arm 223 is directly bolted to the hub 222. One end of the arm 223 carries a wall-scraping blade 229 whilst the other end carries a paddle 237. As best shown in FIGS. 5a and 5b the blade 229 is an upright member adjustably connected to the arm 223 via a bracket 239. Bracket 239 includes a body 239a shaped to sit flat against a planar underside of the arm 223. An end of the body 239 is bolted to the blade 229. The bracket 239 further includes a diagonal brace 239b extending downwardly from the body 239a at an oblique angle to provide further support to the blade 229.

The body 239a has a slotted bolt hole 239c through which a bolt engages a threaded bore of the arm 223 to mount the bracket. An end of the body 239a spaced from the blade 229 is surrounded by a trio of lugs 223a. Each of the lugs 223a defines a respective internally threaded horizontal bore through which a respective adjustment bolt is passed to act on the body 239a. The blade 239 is thus screw adjustable to enable the clearance CW and the clearance angle CA to be varied. Other modes of screw adjustment, and indeed other modes of adjustment more generally, are possible. In this example a clearance of not more than 12 mm, a clearance angle in the vicinity of 8 degrees and a lip angle in the vicinity of 40 degrees are preferred.

The rotating assembly 231 may be held stationary whilst coating is in progress. The stationary blade 229 and paddle 237 can agitate the loose material upwardly driven against those components by the rotation of the base 125. Alternatively, the rotating arrangement may be rotated whilst coating is in progress, e.g. the rotating set of parts 231 might be rotated in a direction opposite to a direction of rotation of the base 125. This can lead to more efficient use of the coating materials in that the coating material can be scraped from a wall before it sets and subsequently adhere to the loose material. The rotating set of parts also provides additional agitation to the loose material whereby 'dead spots' of untreated seeds are less likely—indeed, a bladeless variant of the set of parts 231 would be useful. In this example, the drive and transmission are configured to turn the set of parts 231 at about 5 RPM.

As best shown in FIG. 4B the cylindrical interior of the wall arrangement 121 is partly defined by a door 241 which serves to close an outlet 249 during the coating operation. Door 241 is suspended from a pivotal mounting (defining a horizontal pivot axis) and driven by an actuator 251 to pivot outwardly to open outlet 249 to enable material to pass from the chamber 120 into receiving space 253. The receiving space 253 is downwardly open and shaped to funnel the material down towards a diverter 255 (FIG. 1A). The diverter 255 is operable to selectively direct the material to a selected one of a first outlet 257 and a second outlet 259. Other mechanisms for selectively directing are possible. In this case the diverter takes the form of a flap driven by an actuator 261 and the actuators 251, 261 are pneumatic rams.

A control arrangement 263 (FIG. 1A) in the form of a programmable logic controller co-ordinates the operation of the motor 140, the drive motor (not shown) by which the wall-scraping arrangement 232 is driven, and the actuators 228*a*, 251, 261. The control arrangement 263 is connected to each of the controlled elements via wired connections. Other control arrangements and modes of connection are possible.

The control arrangement 263 incorporates a user interface, e.g. push button, by which the coating apparatus 100 is operable. In use a defined quantity of loose material is supplied via the funnel 122 and coating material is supplied via the member 226. Under the control of the arrangement 263, the base 123 is rotated whilst the wall-scraping arrangement 232 is rotated in the opposite direction and the base-scraping arrangement is held clear of the loose material. After a period of time selected to coat the loose material, the control arrangement 263 automatically opens the door 241. The wall-scraping arrangement 232 may be stopped at this point. Energised by the rotating base 123, the coated loose material is ejected via the open outlet 249 to pass through the receiving space 253, diverter 255 and outlet 259 to a destination such as a vessel or a conveyor belt.

After a period of time sufficient for substantially all of the coated loose material to leave the chamber 120 the control arrangement 263 may close the door 241 and deactivate the motor 140 to await further user and material input.

Preferably the control arrangement 263 is configured to periodically clean the base 123, e.g. to clean the base after a defined number of coating cycles. By way of example, once substantially all of a batch of coated loose material has left the chamber 120, but whilst the door 241 remains open, the base-scraping arrangement 127 may be lowered to its scraping position whereat it remains stationary whilst the build-up carried by the rotating base 123 is driven against it. The build-up on the base 123 is thus scraped off. As previously described, the base-scraping arrangement is shaped to outwardly drive the build-up scraped from the base. It also sits in register with the outlet 249 to assist with the ejection of the waste material via the outlet.

The control arrangement 263 is configured to end this base-scraping mode after a predetermined period of time by elevating the base-scraping arrangement 127 and deactivating the motor 140 before entering the standby mode. Preferably the period is not more than 15 seconds. The inventors have found this is more than adequate to clean the base 123 and that the cleaning assembly 200 can increase the output of the coating apparatus by as much as 50%.

The control arrangement 263 is configured to switch the diverter 255 substantially simultaneously with the lowering of the base-scraping arrangement 127 whereby the waste material is directed through the outlet 257.

Whilst an example of the invention is illustrated, variants of the described outlet 249, diverter 255 and/or the aforedescribed operating sequence may be usefully applied in other contexts, e.g. in the context of a coating apparatus fitted with an entirely different cleaning apparatus.

Figure 9:
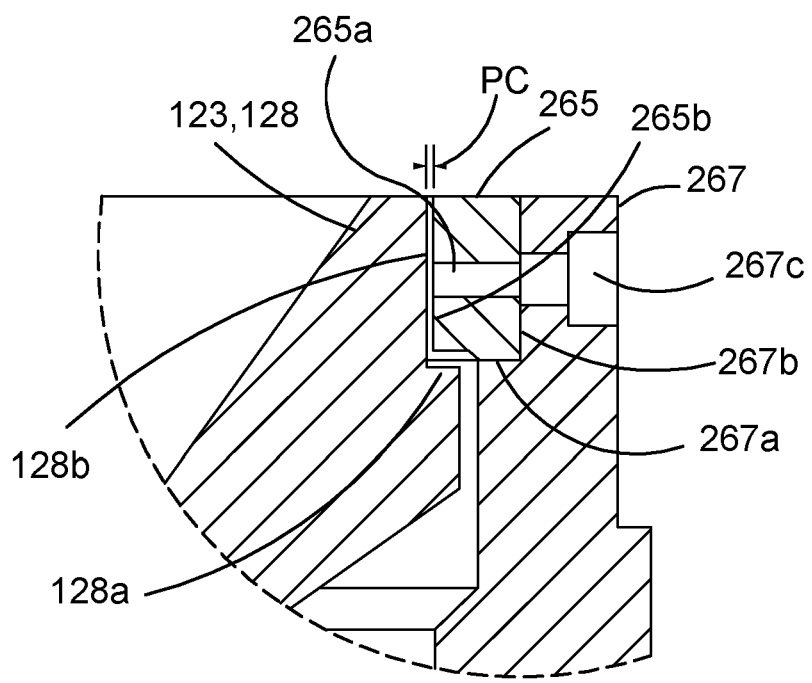
FIG. 9 is an enlargement of detail C in FIG. 8.

The present inventors have recognised that the wear between adjacent portions of the rotating base 125 and the stationary wall arrangement 121 contributes to the cost of operating the coating apparatus. Turning to FIGS. 8 and 9, preferred variants of the apparatus 100 incorporate a replaceable wear arrangement 265 to minimise these costs.

The wall arrangement 121 incorporates a stationary rotor base 267. The base 267 has a heavy steel construction and defines a short cylindrical wall surrounding the rotatable base 125.

An interior of the cylindrical wall of the stationary base 267 is stepped to define an annular ledge 267*a* and an inwardly directed cylindrical 267*b*. An exterior of the base 123, or more specifically the body 128 in this case, has a complementary step defining an annular ledge 128*a* and an outwardly directed cylindrical surface 128*b*.

In this example of the apparatus 100, the replaceable wear arrangement takes the form of an integrally formed ring having a substantially rectangular profile.

A square is an example of a rectangle as the word 'rectangle', and similar wording, is used herein. As the wording is used herein 'integral formation' refers to a single continuous body of material—two bodies may be integrated by welding but not by conventional mechanical fastening.

In this case the arrangement 265 is formed of steel and has a cross section in the vicinity of 10 mm to 12 mm by about 20 mm. Relative to the more substantial stationary base 267 the arrangement 265 is flexible. An exterior of the arrangement 265 is dimensioned to fit within the cylindrical surface 267*b* and the arrangement 265 is held in place by an array of radially oriented bolts passing through counter-bored through holes 267*c* and engaging threaded bores 265*a*. The stationary base 267 thus constitutes a support structure for supporting the arrangement 265.

An interior 265*b* of the arrangement 265 is a cylindrical surface sitting in opposition to the cylindrical surface 128*b*. These opposing surfaces co-operate to impede the escape of material from the chamber 120. Thus the interior 265*b* constitutes an operative portion of the arrangement 265.

Whilst the arrangement 265 is relatively flexible, it is supported by the stationary base 267 to hold its operative portion 265*b* concentric to the rotation axis RA whereby a small peripheral clearance PC (between the surfaces 128*b*, 265*b*) become practical. A nominal clearance in the vicinity of 0.8 mm is preferred albeit that with typical circularity tolerances, and other practical variations, some rubbing occurs. This narrow gap impedes the loss of seed from the chamber 120.

The body 128, or more relevantly the portion 128*b* that might rub against the operative portion 265*b*, is formed of a material harder than the wear arrangement 265 whereby for the most part the arrangement 265 rather than the body 128 wears away as a result of this rubbing. In this case the body 128 is hard chromed. The arrangement 265 can be periodically replaced. By the adoption of the arrangement 265, the service life of the larger components 128, 267 is extended. This is cost efficient.

In other variants of the apparatus 100, the arrangement 265 might take other forms, e.g. instead of a single integrally formed ring, multiple arcuate segments might be placed end to end. Other mounting arrangements and material specifications are possible. Whilst in this example, the stationary base 267 carries the arrangement 265, in other variants the rotor 123 may carry the arrangement 265. Indeed, in yet another variant each of the rotor and the wall arrangement might carry a respective replaceable element.

Various examples of technology have been described. The invention is not limited to these examples. Rather, the invention is defined by the claims. By way of example, whilst the apparatus 100 includes a rotatable base 123, variants of the rotating set of parts may be applied to coating apparatus having no such base.

The invention claimed is:

1. A cleaning arrangement of a coating apparatus for seeds or granules in the form of a loose material, wherein the coating apparatus is a rotary batch coater having a base configured to carry the loose material the base including a conical outer wall for surrounding the loose material;
the base being rotatable to coat the loose material;
the cleaning arrangement including a base-scraping arrangement; and a mounting arrangement by which the base-scraping arrangement is mounted to be reversibly lowered, from a coating position, to a scraping position at which the base-scraping arrangement is positioned to scrape a build-up from the base and includes a portion for scraping the conical outer wall, and wherein the base-scraping arrangement is a non-rotating portion mounted and pivotally lowerable from the coating position to the scraping position for scraping the rotating base, and the coating apparatus having a coating chamber defining a space for holding the loose material, and wherein the base-scraping arrangement is mounted within the coating chamber via the mounting arrangement.

2. The cleaning arrangement of claim 1, the coating chamber including the base and a wall arrangement surrounding the base, and together with the base defining the space for holding the loose material, wherein the cleaning arrangement includes a wall-scraping arrangement configured to rotate independently of the base within the space to scrape the build-up from the wall arrangement.

3. The cleaning arrangement of claim 2, wherein the wall-scraping arrangement is counter rotating relative to the base.

4. The cleaning arrangement of claim 1, wherein the mounting arrangement includes an actuator to move the base-scraping arrangement.

5. The cleaning arrangement of claim 1, wherein the actuator is configured to downwardly drive the base-scraping arrangement.

6. The cleaning arrangement of claim 1, wherein the base-scraping arrangement is shaped for scraping of the build-up from the base to be driven, by rotation of the base, outwardly along the base-scraping arrangement to clear the base of the build-up scraped from the base.

7. The cleaning arrangement of claim 6, wherein the base-scraping arrangement includes a portion for scraping the conical outer wall and inclined rearwardly relative to the rotation of the base.

8. The cleaning arrangement of claim 1, wherein the base-scraping arrangement includes one or more portions for contacting the build-up and mounted adjustably to enable a clearance to the base to be adjusted.

9. The cleaning arrangement of claim 1, wherein the base includes a central raised portion and the base-scraping arrangement is shaped to scrape the central raised portion.

10. The cleaning arrangement of claim 1, wherein the coating apparatus includes a wall arrangement; said wall arrangement surrounding the space for holding the loose material, and said wall arrangement together with the base defining the space for holding the loose material, the cleaning arrangement further including a wall-scraping arrangement configured to rotate within the space to scrape the build-up from the wall arrangement.

11. The cleaning arrangement of claim 10, including a control arrangement configured to coordinate the base-scraping arrangement and the wall-scraping arrangement.

12. The cleaning arrangement of claim 10, wherein the wall-scraping arrangement includes one or more portions for contacting the build-up and mounted adjustably to the enable a clearance to the wall arrangement to be adjusted.

13. The cleaning arrangement of claim 10, wherein the wall arrangement includes an outlet openable to enable the build-up to escape the space and closeable to retain the loose material.

14. The cleaning arrangement of claim 13, wherein the outlet is aligned with the base-scraping arrangement to receive the build-up therefrom.

15. The cleaning arrangement of claim 14, including a control arrangement configured to coordinate the outlet and the cleaning arrangement.

16. The cleaning arrangement of claim 15, including a diverter downstream of the outlet reconfigurable to divert material from the outlet to a selected one of at least two destinations.

17. The cleaning arrangement of claim 16, including the control arrangement configured to coordinate the diverter and the cleaning arrangement.

18. A method of coating the loose material including: supplying the loose material and a coating material to the space of the cleaning arrangement of claim 13; rotating the base to agitate the loose material and the coating material to coat the loose material; operating a wall-scraping arrangement to scrape the build-up from the wall arrangement whilst the loose material and the coating material are agitated to form a coated loose material; and then opening the outlet to enable the coated loose material to leave the space.

19. The method of claim 18, wherein operating of the wall-scraping arrangement includes counter-rotating the wall-scraping arrangement relative the base; and the base-scraping arrangement is a non-rotating position and is pivotally lowered from a position during coating to a base scraping position to provide scraping of the base which is rotating.

20. The method of claim 18, wherein the loose material is seed.

21. The method of claim 19, wherein the loose material is seed.

22. The cleaning arrangement of claim 1, wherein:
the base-scraping arrangement comprises a base-scraping member, which comprise a main body and one or more blades carried by the main body; and, the mounting arrangement comprises an actuated pivotal connection via which the mounting arrangement is pivotably lowerable from the coating position to the base-scraping position.

23. The cleaning arrangement of claim 2, wherein the wall-scraping arrangement comprises an drive arm carrying a wall-scraping blade.

24. The cleaning arrangement of claim 11, wherein the control arrangement comprises a programmable logic controller and a user interface.

* * * * *